United States Patent [19]

Carpenter et al.

[11] Patent Number: 5,734,770
[45] Date of Patent: Mar. 31, 1998

[54] CLEAVE AND BEVEL FIBER OPTIC CONNECTOR

[75] Inventors: James B. Carpenter, Austin; Richard A. Patterson, Georgetown; Ronald P. Pepin, Round Rock, all of Tex.

[73] Assignee: Minnesota Mining and Manufacturing Company, St. Paul, Minn.

[21] Appl. No.: 496,328

[22] Filed: Jun. 29, 1995

[51] Int. Cl.$^6$ ............................................. G02B 6/38
[52] U.S. Cl. .................. 385/72; 385/55; 385/65; 385/70
[58] Field of Search .................... 385/65, 69, 70, 385/72, 73, 55, 56, 57, 58, 62, 75

[56] References Cited

U.S. PATENT DOCUMENTS

| | | | |
|---|---|---|---|
| 4,030,811 | 6/1977 | Khoe et al. | 350/96 |
| 4,077,702 | 3/1978 | Kunze et al. | 385/70 |
| 4,205,898 | 6/1980 | Matthews et al. | 385/72 |
| 4,247,164 | 1/1981 | Mannschke | 350/96.21 |
| 4,422,717 | 12/1983 | Schmidt | 350/96.21 |
| 4,445,752 | 5/1984 | Faber et al. | 350/96.2 |
| 4,478,485 | 10/1984 | Khoe et al. | 350/96.2 |
| 4,522,463 | 6/1985 | Schwenda et al. | 385/70 |
| 4,583,819 | 4/1986 | Duesbury | 385/70 |
| 4,657,338 | 4/1987 | Khoe et al. | 350/96.21 |
| 4,755,018 | 7/1988 | Heng et al. | 385/65 |
| 4,784,460 | 11/1988 | Khoe | 350/96.21 |
| 4,848,870 | 7/1989 | Wisecarver et al. | 385/55 |
| 4,877,302 | 10/1989 | Schurmann et al. | 350/96.21 |
| 4,978,193 | 12/1990 | Tomita | 385/55 |
| 5,121,456 | 6/1992 | Essert et al. | 385/70 |
| 5,189,717 | 2/1993 | Larson et al. | 385/95 |
| 5,381,498 | 1/1995 | Bylander | 385/83 |
| 5,394,497 | 2/1995 | Erdman et al. | 385/78 |

FOREIGN PATENT DOCUMENTS

| | | | |
|---|---|---|---|
| 0 338 758 A2 | 10/1989 | European Pat. Off. | |
| 3726421 A1 | 2/1989 | Germany | |
| PCT/US94/ 08605 | 3/1995 | WIPO | B24B 19/22 |

*Primary Examiner*—Akm E. Ullah
*Assistant Examiner*—Hemang Sanghavi
*Attorney, Agent, or Firm*—Gerald F. Chernivec; John C. McFarren

[57] ABSTRACT

A device for interconnecting the bare ends of two or more optical fibers uses a common receptacle having a fiber clamping element therein and camming surfaces for actuating the element, and at least one plug having a camming finger for engaging one of the camming surfaces. The camming surfaces are located such that, when only one of the camming surfaces is actuated, the clamping element rocks to a side of the pocket opposite the one camming surface and remains in the open state, but when both of the camming surfaces are actuated, the clamping element is forced to the closed state. The plug includes a fiber protector free to slide within the plug housing, substantially enclosing the bare end of the fiber when the plug housing is removed from the receptacle, but retracting when the plug housing is inserted into the receptacle to direct the bare end of the fiber toward said guide tube. A fiber collet biases the terminal end of the fiber toward the forward end of the plug to place a preload condition on the bare end of the fiber. The connector is particularly suited for cleave-and-bevel installations. The receptacle preferably uses a novel clamping element having two plate members with fiber-contacting surfaces, at least one of said fiber-contacting surfaces having a fiber-receiving groove. Edges of the plates are aligned and held together with a split tube spring. At least one of the plate members is provided with a wire-receiving groove and a wire therein which acts as a fulcrum to allow the plates to pivot along an axis defined by the wire. The split tube spring provides a precisely controlled load along the edges of the plates, allowing the opposite ends to be clamped together (within the guide tube) by a force sufficient to overcome the controlled load of the split tube spring.

20 Claims, 5 Drawing Sheets

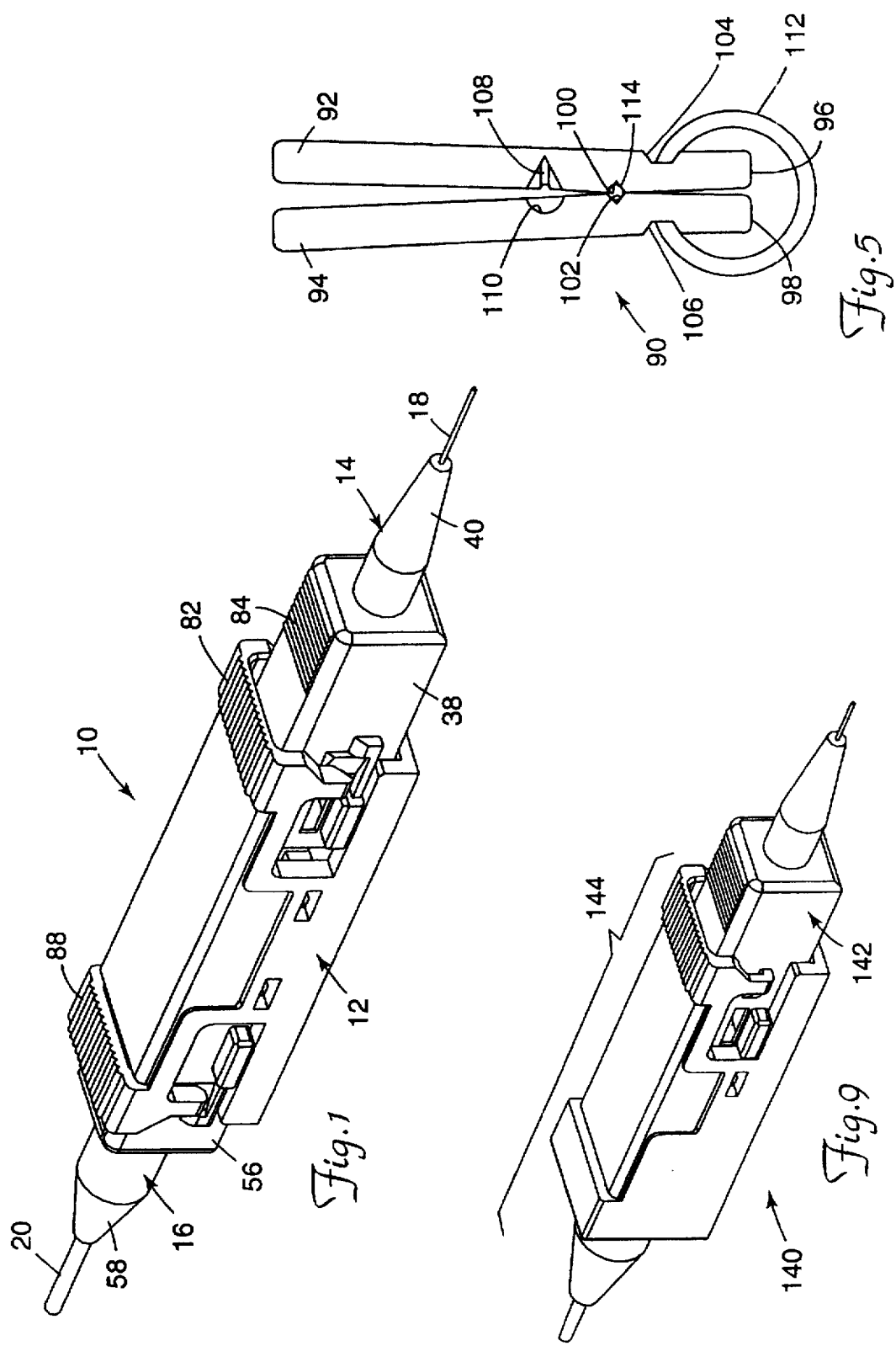

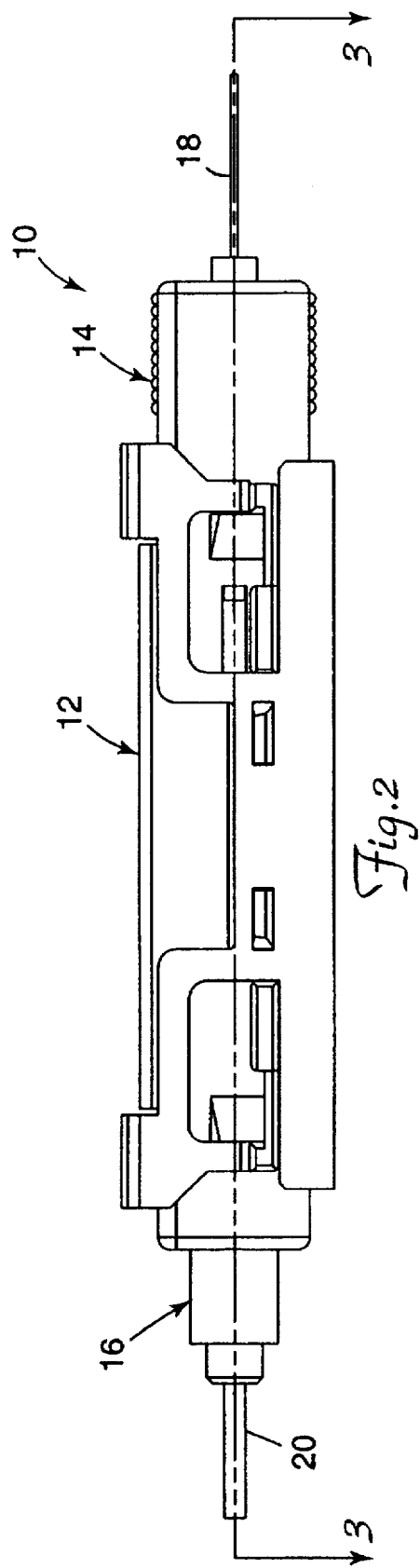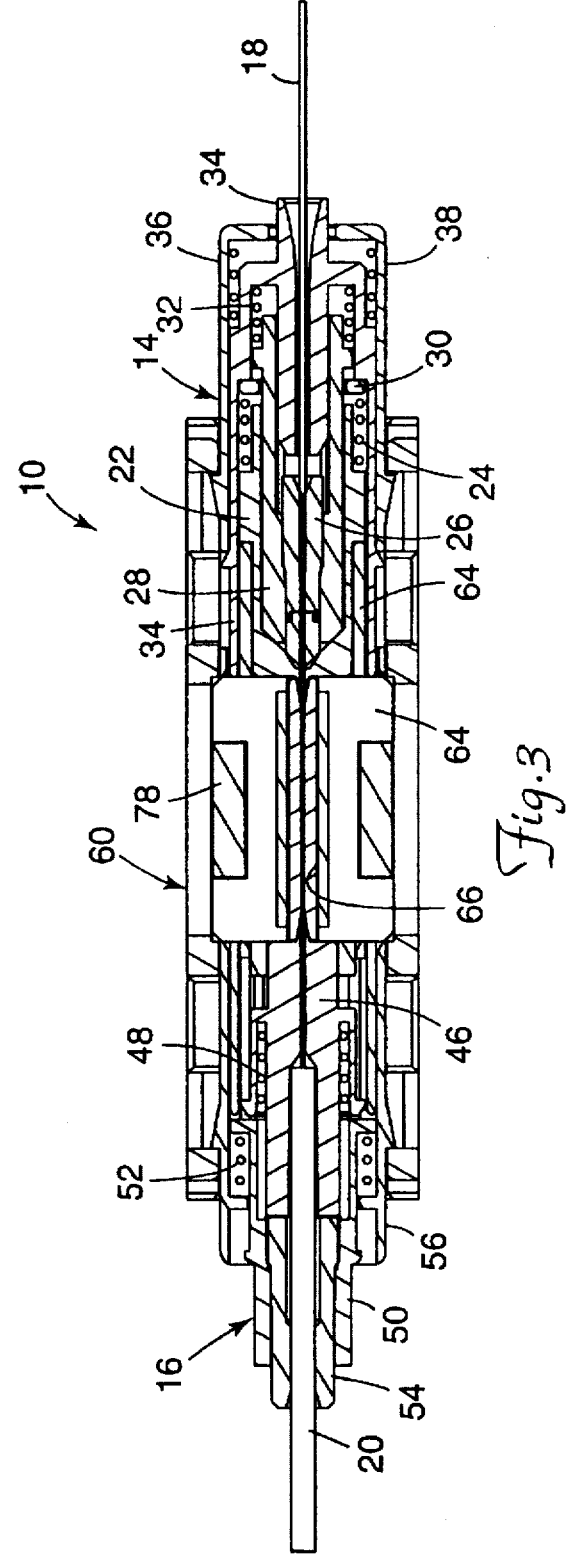

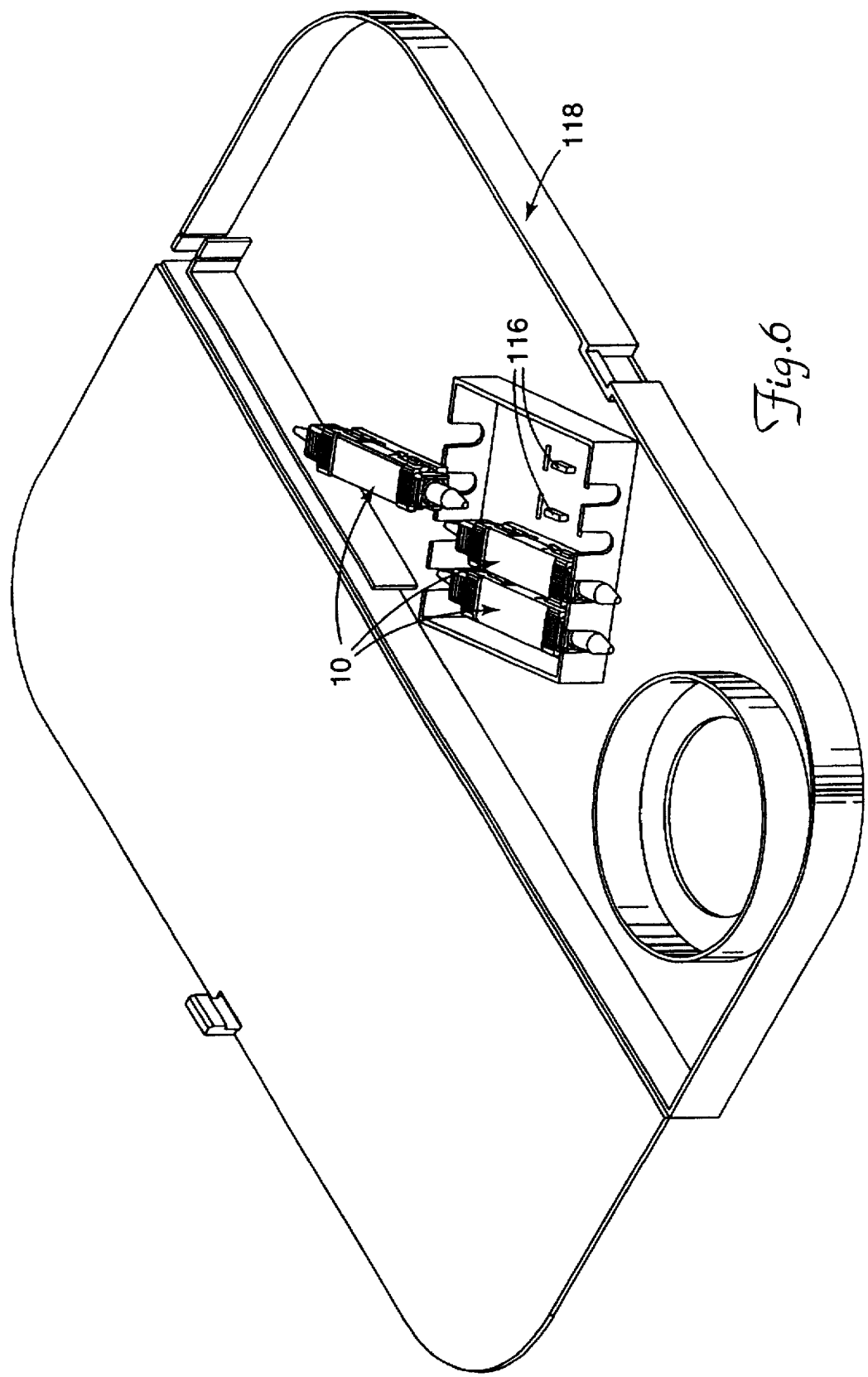

CLEAVE AND BEVEL FIBER OPTIC CONNECTOR

BACKGROUND OF THE INVENTION

1. Field of the Invention

The present invention generally relates to connectors, and more particularly to remateable connectors for optical waveguides such as fibers used in telecommunications.

2. Description of the Prior Art

Many single mode discrete fiber optic connector plug designs in use today contain precision cylindrical ceramic ferrules that are mounted in the connector plugs. Bare glass optical fibers are bonded in close fitting axial bores in these ferrules, and the fiber and ferrule tips are polished to provide low insertion loss and back reflection connections. The connector housings used with these ferrule connector plugs may contain split ceramic sleeves which center and align the ferrules when the connector plugs are inserted into opposite ends of the housing. Alignment of the ferrules brings the centers of the fibers into alignment providing relatively low insertion loss. Springs in the connector plugs force the polished fiber end faces into intimate contact which provides relatively low back reflection. Versions of ceramic ferrule connectors are also available that contain angle polished ferrule/fiber tips which, when mated with similar connector plugs, provide extremely low back reflection.

Single mode discrete fiber optic connectors containing ceramic ferrules have been dropping in price and improving in performance within the past few years. This downward price trend is expected to continue as the cost of ceramic ferrules and ceramic alignment sleeves drops; however, there is expected to be a lower limit on the price of fiber optic connectors, which is related to the lower cost limit on the ceramic ferrules and sleeves. Also, most single mode ceramic ferrule connector in use today are factory installed on fiber pigtails or jumper cables. These connectors pigtails are usually fusion or mechanically spliced onto fiber optic cables. Because of the difficulty in bonding fibers in ceramic ferrules, and then precisely polishing the tips of the fibers, very few ceramic ferrule single mode connectors are field installed. Thus, the relatively high cost and lack of field installability of single mode ceramic ferrule connectors has not been adequately addressed in the prior art.

Another line of interconnection products, particularly adapted for permanent splices, uses a fiber clamping element that is embossed with grooves of various types to provide fiber locating and alignment, and fiber lead in features. An example of such a product is the Fibrlok splice element, currently fabricated from a single sheet of ductile aluminum (Fibrlok is a trademark of Minnesota Mining and Manufacturing Co., assignee of the present invention). The outside shape of the element is usually rectangular, and is created by blanking the element from its carrier strip. A bend-focusing groove divides the rectangular element blank into two equal, generally rectangular areas or plates. At least one of these plates contains a V-shaped, fiber-locating and clamping groove which runs parallel to the bend-focusing groove. The V-groove depth is such that a 125 μm fiber located in this groove would project out of the groove by about 50 μm. Funnel shaped fiber lead-in grooves are provided at each end of the fiber-locating V-groove. The opposing plate also contains funnel shaped fiber lead-in grooves located the same distance from the bend-focusing groove as the funnel shaped lead in grooves in the first plate.

The flat Fibrlok blank is folded along the bend-focusing groove until one plate is at approximately at a 5 to 10 degree angle with respect to the other plate, creating a structure consisting of two essentially rigid plates containing inwardly facing, fiber-clamping V-grooves that are joined along one edge by a hinge which operates elastically for small ranges of plate motion. When used in a Fibrlok splice, this folded V-shaped element is located inside a plastic jacket having end ports that are in alignment with the fiber-locating and clamping V-groove in the element. A plastic cap fits over the outside edges of the open element plates or legs. The cap contains a tapered recessed area that slides down over the outside of the element legs when the cap is closed, causing the two legs of the element to move together which clamps and centers a pair of fibers located within the V-groove.

Ductile aluminum was chosen as the material for choice for Fibrlok elements because of its low cost, and its ability to be easily embossed and then folded without cracking or breaking. In addition, the ductility of the aluminum enabled it to more easily conform to the outside fiber surfaces without placing excessively high stress loads on the fiber during the clamping of the fiber in the V-shaped locating groove. Such a ductile material has, however, certain disadvantages. For example, it is difficult to repeatedly use such an element, i.e., by actuating and de-actuating the clamping plates, since multiple reclampings of a fiber in a ductile element do not allow the fiber to adequately embed itself in the alignment groove, and so the element clamping forces or fiber alignment precision potential on repeated reclosings is reduced. Therefore, such an element is generally unsuited for use in a remateable connector. Another weakness identified for aluminum elements is their relatively high coefficient of thermal expansion. This expansion can cause the clamped fiber endfaces to actually come apart at higher temperatures. Although this is less of a concern if the connection is assembled at room temperature, it is more of a concern if the connection is assembled at very low temperatures.

Still another potential weakness of an aluminum element is the difficulty encountered when attempting to clean it following the various embossing and folding operations. When the V-grooves and lead-in cones are created in the aluminum element strip material, small flakes of aluminum are often generated that adhere to the side walls and edges of the V-groove. Small particles or flakes of aluminum are also generated along the bend-focusing groove when the element is folded. If any of these flakes or particles of aluminum become dislodged during insertion of bare fibers into the element, they may become attached to the one of the fiber end faces and block a portion of the core, severely affecting insertion loss. Attempting to clean the fiber locating V-grooves in soft ductile aluminum before folding often damages or scratches the V-groove. Abrasive cleaners cannot be used because they become embedded in the soft aluminum side walls of the V-grooves. Cleaning the element after folding is virtually impossible because of the small spaces between the legs of the element.

Still another potential weakness of the folded aluminum element is that it is necessary to very carefully control the distance that the legs of the element are closed during the fiber clamping operation. If the legs are closed too far, the hinge of the element can be sprung open, and the element will not be able to clamp the fibers on subsequent actuations. Furthermore, when fibers of different diameters are used in the hinged aluminum element, it is possible for one of the fibers to receive less clamping force than the other, which can result in fiber slippage and fiber end separation. It would, therefore, be desirable to devise a clamping element which would overcome the foregoing limitations. It would be further advantageous to incorporate such an element into a remateable, bare fiber connector having significantly lower initial cost than ferrule connectors, and to provide such a connector for single-mode use that is easily field installable with simple procedures and low cost, easy to use, field installation tooling, and yet still provides the same or better performance than existing ferrule connectors.

SUMMARY OF THE INVENTION

The present invention provides a ferruless, bare fiber connector generally comprising a receptacle and two plug assemblies, the receptacle including a fiber clamping element movable between open and closed states, a guide tube having a pocket for receiving the clamping element and camming surfaces for actuating the clamping element, a base having an interior for receiving the guide tube, and a cap for securing the clamping element in the pocket and for securing the guide tube in the interior of the base. Each plug assembly is adapted to mate with the receptacle, and includes a plug housing, a collet securing a portion of the bare end of a fiber within the plug housing and positioning the bare end of the fiber at the forward end of the plug housing, and a camming finger attached to the forward end of the plug housing and extending outwardly therefrom, located such that when the plug housing is fully inserted in the receptacle, the camming finger forcibly abuts the camming surfaces. Latching features are preferably provided on the plug housings and the receptacle for removably securing the plug housings to the receptacle, i.e., the connector is remateable.

The pocket in the guide tube of the receptacle may be sized to allow the clamping element to rock within the pocket, and the camming surfaces located such that, when only one of said camming surfaces is actuated, the clamping element rocks to a side of the pocket opposite the one camming surface and remains in the open state, but when both of said camming surfaces are actuated, the clamping element is forced to the closed state.

Each plug assembly preferably includes a fiber protector located in the plug housing and attached thereto such that the protector is free to slide within the plug housing, the fiber protector substantially enclosing the bare end of the fiber when the plug housing is removed from the receptacle, but retracting when the plug housing is inserted into the receptacle to direct the bare end of the fiber toward the guide tube. The collet is preferably biased toward the forward end of the plug housing to place a preload condition on the bare end of the fiber when the plug housing is inserted into the receptacle. The size and shape of the camming finger is selected to actuate the camming surfaces only after the bare end of the fiber has been fully inserted in the receptacle.

The connector of the present invention is particularly suited for cleave-and-bevel installations and, by compressive loading of the beveled fiber endfaces prior to clamping, achieves superior performance in terms of both insertion loss and back reflection. The endfaces elastically flattened against one another, and exclude all air between the fiber endfaces. The endfaces may optionally be cleaved at an angle to further improve back reflection.

The receptacle may employ a prior art clamping element, but a novel element is presented herein which imparts additional advantages in the manufacture and use of the connector. This new clamping element has two plate members each having a fiber-contacting surface, with at least one of said fiber-contacting surfaces having a fiber-receiving groove formed therein. Edges of the plates are aligned and held together with a split tube spring. At least one of the plate members is preferably tapered in thickness toward the secured edge, so that the plates are spaced apart at the ends opposite the clamped edges. At least one of the plate members is provided with a wire-receiving groove and a wire therein, generally parallel with the fiber-receiving groove, which acts as a fulcrum to allow the plates to pivot along an axis defined by the wire. The split tube spring provides a precisely controlled load along the edges of the plates, allowing the opposite ends to be clamped together (within the guide tube) by a force sufficient to overcome the controlled load of the split tube spring. The fiber-receiving V-groove may be pre-formed at the factory by sliding another fiber in the clamping element, actuating the element about the fiber, de-actuating the element, and then removing the fiber from the element. The plates may be constructed of a material having an appropriate coefficient of thermal expansion to avoid creeping of the fiber endfaces during temperature cycling. This new element achieves improved performance for repeated rematings, provides means for installing, gripping, and strain relieving the fiber on its buffer coating, protects the bare glass fiber and the cleaved/beveled fiber end face, and provides guiding and alignment features that ensure that the fiber end can enter the fiber alignment element without hanging up.

BRIEF DESCRIPTION OF THE DRAWINGS

The invention will best be understood by reference to the accompanying drawings, wherein:

FIG. 1 is a perspective view of one embodiment of the fiber optic connector of the present invention;

FIG. 2 is a side elevational view of the connector of FIG. 1;

FIG. 3 is a top sectional view of the connector of FIG. 1;

FIG. 5 is a side elevational view of an alternative fiber aligning and clamping element as taught by the present invention and usable with the connector of FIG. 1;

FIG. 6 is a perspective view of a connector storage tray containing several of the connectors shown in FIG. 1;

FIG. 9 is a perspective view of still another connector constructed in accordance with the present invention, having a plug and socket instead of two plugs and a common receptacle.

DESCRIPTION OF THE PREFERRED EMBODIMENT

Figure 4:
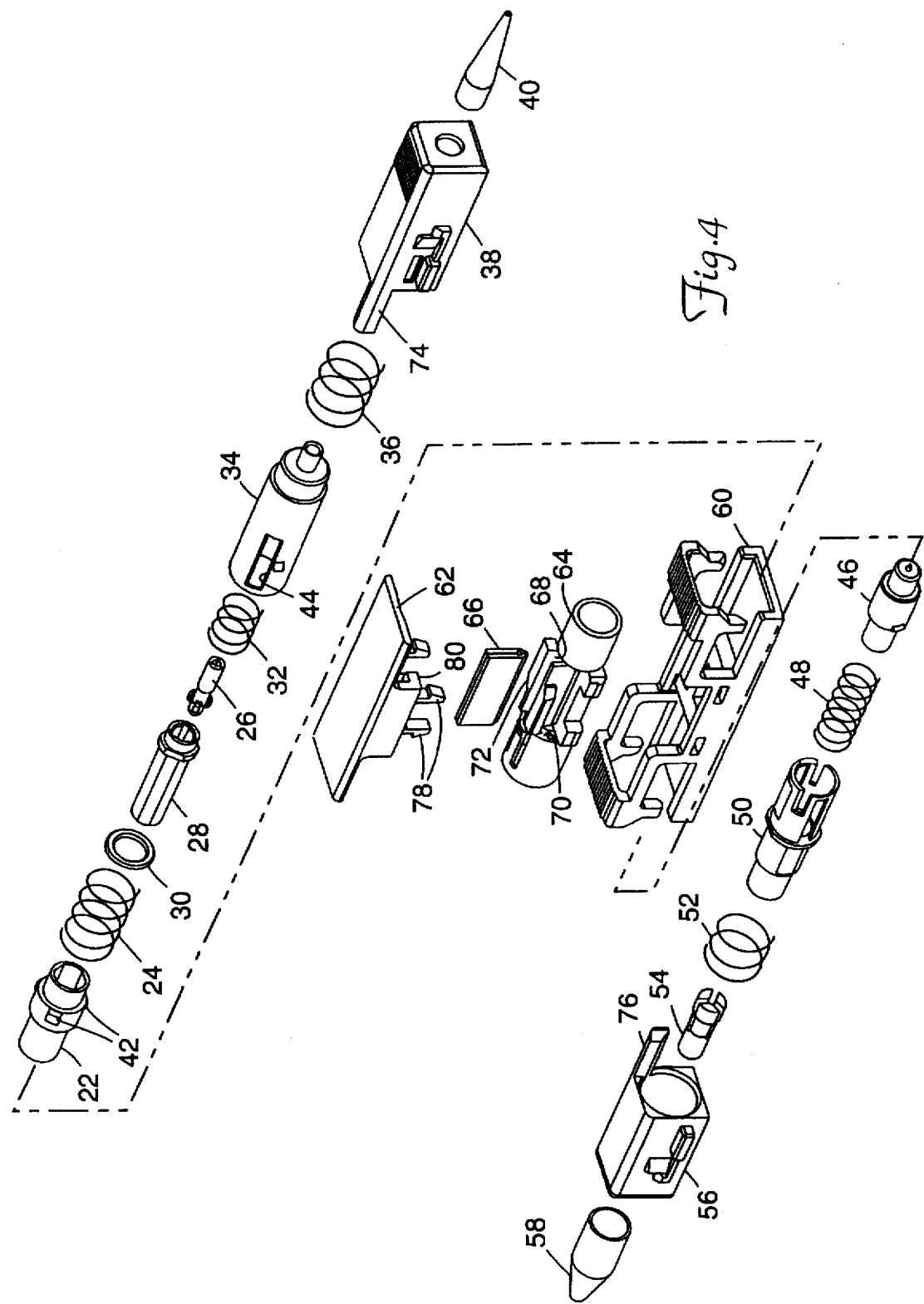
FIG. 4 is an exploded perspective view of the connector of FIG. 1.

With reference now to the figures, and in particular with reference to FIGS. 1 and 2, there is depicted one embodiment 10 of the fiber optic connector of the present invention. Connector 10 is generally comprised of a housing or receptacle 12 having two open ends which receive, respectively, two plug assemblies 14 and 16. In the embodiment shown, plug assembly 14 is designed for a 250 μm optical fiber 18, while plug assembly 16 is designed for a 900 μm optical fiber 20. While connector 10 is suitable for the interconnection of different fibers, it is of course equally useful in connecting fibers of identical size. Connector 10 may be used for single-mode or multi-mode fibers.

Details of the construction of receptacle 12 and plug assemblies 14 and 16 are shown in FIGS. 3 and 4. Plug assembly 14 includes a tubular fiber protector 22, a protector spring 24, a collet 26, a collet housing 28, a collet ring 30, a collet spring 32, a plug body 34, a plug body spring 36, a plug housing 38 and a strain relief boot 40 (not shown in FIGS. 2 and 3). All of these components, except for the compression springs, are preferably constructed of a durable, injection-moldable polymer such as polyether sulfone (PES), polycarbonate (commercially known as LEXAN), polyarylsulfone (sold by Amoco under the brand RADEL), polybutylene terephtalate (PBT), polyphenylene sulfide (PPS), polyether ether ketone (PEEK), polyether imide (PEI), liquid crystal polymers, or acrylonitrile butadiene styrene. These parts fit together in the sequence illustrated in FIG. 4. Fiber protector 22 slides in and out of plug body 34 and is biased by spring 24 toward the front end of plug assembly 14, i.e., toward receptacle 12. Bumps or tabs 42 project from the skirt of fiber protector 22 to engage slots 44 formed in the sides of plug body 34, to prevent protector 22 from completely escaping plug body 34, and to prevent protector 22 from rotating. The forward tip of fiber protector 22 has a wall with a hole that is concentric with the outer diameter of the forward tip, and approximately 0.05 mm (0.002") larger than the diameter of the fiber. The terminal end of fiber 18 slides through this hole and is precisely located as protector 22 moves into plug body 34 when plug assembly 14 is inserted into receptacle 12. Closely aligning the end of the bare fiber with the entry feature on the clamping element prevents damage to the bare end of the fiber during insertion. During plug removal the force on the protector ensures full retraction of the bare end of the fiber into the protector prior to any withdrawal of the protector from the receptacle, protecting the bare end of the fiber.

The 250 μm fiber buffer is clamped in the 3-jaw collet 26 that fits inside of collet housing 28. Collet 26 and collet housing 28 can move axially approximately 1.3 mm (0.050") inside plug body 34 with spring 32 providing a preload of the collet assembly, toward the forward tip of the plug assembly, of approximately 0.9N (0.2 lbs). Plug housing 38 snap-fits over the outside of plug body 34 and slides with respect to plug body 34 against the other preload spring 36. Boot 40 provides bending strain relief for the fiber buffer exiting the back end of the plug.

Plug assembly 16 includes a similar fiber protector 46, a protector spring 48, a plug body 50, a plug body spring 52, a collet 54, a plug housing 56 and another strain relief boot 58 (not shown in FIGS. 2 and 3). All of these components (again except for the compression springs) are also preferably constructed of an injection-moldable polymer. As with plug assembly 14, fiber protector 46 is retained in plug body 50 by externally projecting snap features, and is allowed to slide but not rotate. Spring 48 preloads protector 46 toward the from end of the 900 μm plug assembly, i.e., toward receptacle 12. Collet 54 fits inside plug body 50 and clamps onto the 900 μm fiber buffer when the collet is fully seated axially into the back of plug body 50. Plug housing 56 also snap-fits over plug body 50 for restricted sliding motion, and spring 52 provides a preload between plug housing 56 and plug body 50.

The plug assemblies have features on mating internal components that allow for complete factory assembly of the plug units to reduce field part count and maximize ease of installation. These features allow the installer to simply prepare the fiber end as prescribed and insert it into the plug assembly and, by means of a small tool, fully retract the protector which activates the collet and secures the fiber to the plug assembly, thereby terminating that fiber for connection. In the event of fiber breakage, these features provide means to deactivate the termination by dislodging the collet in an assembly tool and allowing the fiber to be removed. The fiber end can then be prepared again and reinstalled as previously stated.

Receptacle 12 includes a base 60, a cap 62, an internal guide tube 64 and a clamping element 66. Base 60 and cap 62 together form the exterior portion of the receptacle, and may be constructed of any durable injection-moldable polymer. Guide tube 64 may also be formed of such an injection-moldable material. Guide tube 64 snap-fits into the center of receptacle base 60, and has circular end ports that are aligned with the V-groove in clamping element 66 when the element is installed in guide tube 64.

Clamping element 66 is preferably embossed from a metallic material, and utilizes V-groove technology similar to that shown in U.S. Pat. No. 5,189,717. Clamping element 66 consists of two generally flat plates that are attached along their long edge by an elastic hinge. The plates would normally be opened slightly about the hinge axis, preferably at an angle of approximately 1 to 8 degrees. The interior surface of one of the plates has a fiber alignment V-groove and half of the fiber lead-in (a funnel shaped impression) positioned at each end of the V-groove where it exits the outside edge of the plate, at a distance from the hinge of approximately ¼ of the width of the plate. The V-groove is parallel to the hinge. The interior surface of the other plate is generally flat with the exception of the other half of the fiber lead-in funnel which is aligned with the lead-in details in the opposite plate. The fiber lead-ins assure that the fiber is smoothly guided into the V-groove in the element when plug assemblies 14 and 16 are inserted into the connector receptacle.

The fiber alignment and clamping V-groove is embossed to a depth in the element plate so the outside surface of the fiber will project out of the V-groove by approximately 20% of it diameter. Thus when the plates or legs of the element are in their open or spread apart position, there is enough space between the flat surface of one of the plates and the sides of the V-groove in the other plate to enable a fiber to be inserted into the ends of the V-groove, and slide along in the V-groove without significant resistance. The fit between the V-groove and opposite plate surface is not large enough however to allow the fiber to come out of the V-groove, or for two beveled fibers to overlap when inserted from opposite ends of the V-groove. When the top edges of the two plates opposite the hinge are pushed together, the spacing between the opposing plate and the V-groove becomes smaller. In its relaxed (unactuated) mode, the two legs of the element are spread far enough apart to enable an optical fiber to be inserted into opposite ends of the V-groove so that the joint between the fibers is approximately located at the center of the element. When the element is actuated or closed (as explained below), the legs of the element are pushed together about the elastic hinge, and the fibers are clamped in the V-groove. It is also possible to provide an element in which fiber-receiving grooves are provided in both plates. It may be advantageous to preform these grooves by clamping a single fiber between them at the factory to provide more uniform groove surface finish and alignment of fibers. Multiple grooves may be formed for use with fiber ribbon.

The fiber alignment and clamping element 66 illustrated in FIG. 4 has been designed to be fabricated from a single sheet of metallic or polymeric material using, e.g., embossing, blanking and folding processes. This element is very similar to the element used in the Fibrlok fiber optic splice. However, it is possible to provide other designs, such as an element that consists of two separate plates that are attached by a spring tube, as detailed below.

Clamping element 66 fits into a pocket 68 in the top of guide tube 64. Flexible hinged flaps containing camming surfaces 70 and 72 on their upper outside edges are provided on either side of pocket 68. The camming surfaces contact corresponding camming surfaces on actuating fingers 74 and 76 which project from the front ends of plug housings 14 and 16, respectively, as the plugs are pushed into the receptacle. The camming surfaces on plug fingers 70 and 72 contact the outside of the element camming flaps 70 and 72 and push the flaps together when both plug assemblies 14 and 16 are fully inserted into receptacle 12.

In their open position, there is enough space between the flaps for the element to pivot or rock from side-to-side, preferably through an angle of approximately 5 to 10 degrees. If only one plug assembly is inserted, the actuating finger from the plug housing pushes the corresponding camming flap toward the centerline of pocket 68, but since the other flap is not contacting anything, element 66 rocks off to one side of pocket 68 and so element 66 does not close on the fiber or clamp it in the V-groove. When the other plug is inserted, however, its actuating finger pushes the opposing camming flap back toward the centerline of pocket 68 and, because the element is now forcibly abutting both camming flaps, the element plates close and clamp the fibers residing in the V-groove. Thus all of the necessary fiber protecting, guiding, centering, and clamping operations occur during the plug insertion and removal process. Latching features on the outside of receptacle base 60 and plug housings 38 and 56 removably secure plug assemblies 14 and 16 to receptacle 12. Insertion of the connector plugs into the receptacle causes tabs on the sides of each plug housing 38 and 56 to slide under the latch portions of the thumb release latches. When the tabs clear the latch portions, they move back together and hold the connector plug housings in position within the receptacle. To release each connector plug, the thumb latches are pressed toward the connector plug body, disengaging the latch portions from the tabs on the plug housings, and allowing the housings and connector plug bodies to move back out of the connector receptacle.

Receptacle cap 62 snap-fits onto receptacle base 60 by means of latching fingers 78, capturing element 66 and tube 64 inside base 60, and completing the connector receptacle assembly. Cap 62 also contains surfaces and wall structures 80 that back up the flat, non-camming, opposite side of actuating fingers 74 and 76 to prevent the fingers from flexing outwardly from the force of contacting and camming to close clamping element 66. This embodiment of the invention allows the cap to be removed for replacement of clamping element 66 in the event that, e.g., a fiber breaks off in it, or dirt contamination in the element. A small tool may be required to press latching fingers 78 together so they can be disengaged from their mating holes in base 60, so as to free cap 62. Receptacle 12 and plug 14 may be provided with ridges 82 and 84 (FIG. 1), respectively, to providing better gripping action for the thumb and fingers.

Referring now to FIG. 5, there is depicted a novel design for a clamping element 90 which has several advantages over the single piece element 66, primarily because element 90 may be constructed from a wider variety of materials, particularly those with greater abrasion resistance and hardness than the single piece folded element 66. The new element 90 is generally comprised of two essentially flat, rectangular plates 92 and 94 that are slightly tapered along one edge 96, 98. These edges are shown flush with one another and, while this is preferred, it is not necessary that they be perfectly aligned but it is sufficient that effective edges of the plates be generally aligned to effectuate the pivoting action describe below. Shallow V-grooves 100 and 102 are formed in this tapered area on each plate. On the back flat side of the element plates and at the tapered end, deeper grooves 104 and 106 are formed slightly closer to the edge of the tapered end of the element. One of the flat element plates 92 has a V-shaped fiber locating and clamping groove 108 with a V-shaped lead-in port at each end of the V-groove. The opposite element plate 94 has a pair of companion half-cone shaped fiber lead-in grooves 110. Plates 92 and 94 are held together with a split tube spring 112 the legs of which fit into grooves 104 and 106 on the back side of plates 92 and 94. As mentioned above in conjunction with element 66, two grooves may be formed, one in each plate, rather than just one groove with a flat back-up surface. Tube spring 112 is preferably fabricated from a metallic material such as beryllium copper or stainless steel, and is held opened slightly to fit over the element plates and into the locating grooves. This design provides a slight force preload condition to occur between plates 92 and 94.

An alignment and pivot wire 114 may optionally be inserted into matching V-grooves 100 and 102 located in the thicker section of the tapered region of the element plates. Wire 114 functions as a pivot or fulcrum hinge, and keeps both plates 92 and 94 properly aligned when the outside edges of the plates opposite the tapered sections are forced together during fiber clamping. In its open condition, the tube spring pushes against the outside of each plate and forces the plates to be in contact at hinge wire 114, and also along the edged of the thin portion of the tapered section of each plate. In the open position, the inside edges of plates 92 and 94 are preferably located at an angle of approximately 5 degrees with respect to one another. This amount of opening is large enough to allow 125 μm optical fibers to be easily inserted from opposite edges of the plates into the fiber-locating V-groove 108. The fibers have approximately 15 to 25 μm of clearance between the two sides of the V-groove, and the mating flat surface of the opposite plate. This amount of clearance ensures that the fiber end faces (particularly beveled end faces) come into contact in the V-groove without allowing the fibers to pass by one another at the center of the V-groove during insertion. The half-funnel shaped fiber lead-in features on the element plates ensure that the fibers easily enter the V-groove during the insertion process.

When used in connector 10, cleaved and beveled fibers are inserted from opposite ends of element 90, and their end faces contact one another at approximately the center of the element. The fibers preferably are pushed toward one another with a longitudinal load of approximately 0.9N (0.2 lbs), causing the reduced area cleaved fiber end faces to elastically flatten against one another, reducing insertion loss and back reflections. To clamp the fibers in the V-groove, the non-tapered edges of the element plates are pushed together (as with element 66) causing plates 92 and 94 to initially pivot about the pivot wire, and causing the tapered edges of the elements to move out of contact. At some point as the element plates move closer together, the space between the fiber clamping V-groove and the fibers is reduced, and the fibers are clamped. Additional closing of the tops of the element plates finally causes the plates to be in full contact with the fiber, and to move out of contact with the hinge wire. The clamping force in the tube spring now accurately controls the clamping forces on the fibers. In theory, any level of clamping force could be accurately provided on the fibers by sizing the tube spring to provide this force; a force of about 44.5N (10 lbs) is preferred. If the fibers were slightly different in diameter, the tube spring advantageously would elastically deform slightly more at one end than at the other to accommodate fiber diameter mismatch. Thus element 90 is particularly useful in bare fiber connectors such as the present invention that utilize axially preloaded cleaved and beveled fibers.

Clamping element 90 has a number of advantages over the existing all aluminum element especially when used in bare fiber connecting applications. In the current Fibrlok element, the hinge and the element are integral and made of the same material. Forming this hinge in the current element requires that the element material be very ductile initially, and then be able to work harden to provide the elastic hinge properties over a very short range of motion. This limits the number of materials that are available for making the element in this design. In the new two plate element design with the tube spring and hinge wire, the element plate material can be selected on the basis of most desirable properties for fabrication to eliminate surface particles, for abrasion resistance and hardness to prevent fiber impressions in the V-groove area, for ease of cleaning, for low coefficient of thermal expansion (less than $12 \times 10^{-6}$ inches/inches/°F.), and for resistance to chemical attack. With this design freedom, a much wider range of element materials can be considered. Some materials which may have desirable properties for element 90 include stainless steel, titanium, ceramics, glass, and possibly some low CTE, high stiffness polymers. Element 90 may be easier to fabricate than the existing element because the required hinge forming and folding process is eliminated, because less material must be displaced in the forming process, and because the element flats will be more robust and easier to clean. The separate tube spring is expected to provide more uniform fiber clamping forces even when the plates are closed over a wider range of displacements. Tube spring 112 has the capability for providing the desired fiber clamping forces on the fiber even if the element is closed further than is required. In the prior art element design, over-closing the element may cause the hinge to stretch or distort which initially produces very high fiber clamping forces. On subsequent closings, the distorted hinge cannot provide adequate forces to clamp the fibers in the V-groove.

Although the new element concept has been designed for primarily connecting applications, it may also be useful in splicing applications, i.e., for the permanent interconnection of optical fibers. The prior aluminum element in the Fibrlok splice changes its length with temperature variations. This is believed to cause the fiber end faces to move apart and back together slightly as the element changes length during temperature cycling. The back and forth motion of the fiber end faces is also believed to cause the index matching gel used in the splices to flow around the ends of the fibers, and possibly create air bubbles or carry dirt particles in the gel between the fiber cores and block some transmitted light. An element material with a very low coefficient of thermal expansion would therefore be beneficial in eliminating the potential for gel motion and associated formation of gas bubbles or conveying dirt particles between the fiber end faces at the core region of the fibers. There have also been instances in which the initial yield of assembled prior art splices has been reduced because of manufacturing dirt or debris in the fiber clamping V-groove in the aluminum element. An element, such as element 90, constructed from a material that could with stand more rigorous cleaning without damage to the V-groove, would increase the initial assembly yield or percentage of low loss splices produced. Because of the wide range of element plate materials that are possible with the new design element, it is expected that a "cleaner" element could be provided for splicing.

The connector of the present invention can be used in a variety of different applications. FIGS. 1–4 show a connector 10 adapted for tray mount applications with both fiber plugs inserted into the ends of the receptacle. In this embodiment, the connector receptacle 12 does not have an externally projecting mounting flange, but rather contains an internal cavity that snap fits over a mounting post 116 on a flat plate such as might be found in the bottom of a connector storage/fiber management tray 118 as shown in FIG. 6. The outside shape of this tray mount connector embodiment has been kept as small as possible so that connectors can be positioned adjacent to one another and occupy the very least amount of volume. Tray 118 might contain up to 4 connectors. Posts 116 are hollow so that a pin like tool may be inserted through the hollow portion to lift the connector off the post and out of the tray for easy access to an individual connector. This system is particularly suited for fiber-to-the-home applications. In the design illustrated in FIGS. 1–4 and 6, the 250 µm plug is spring preloaded but the fiber in the 900 µm plug is mounted in the plug solidly, and would not be spring loaded. Although the two plugs of FIGS. 1–4 are of different designs, they could be the same design as long as at least one plug contains means for preloading one fiber against the other. The device preferably subjects the terminal endfaces of the fibers to a compressive load of at least 0.09N. The interior of tray 118 may be provided with one or more spools for storing excess fiber slack. Very thin spools may be provided which stack onto a common post molded into the tray floor (not shown) so that individual fibers may be separately wound onto the spools and later accessed by removing the spools above the desired fiber, without manipulating (and possibly damaging) the other individual fibers.

Figure 7:
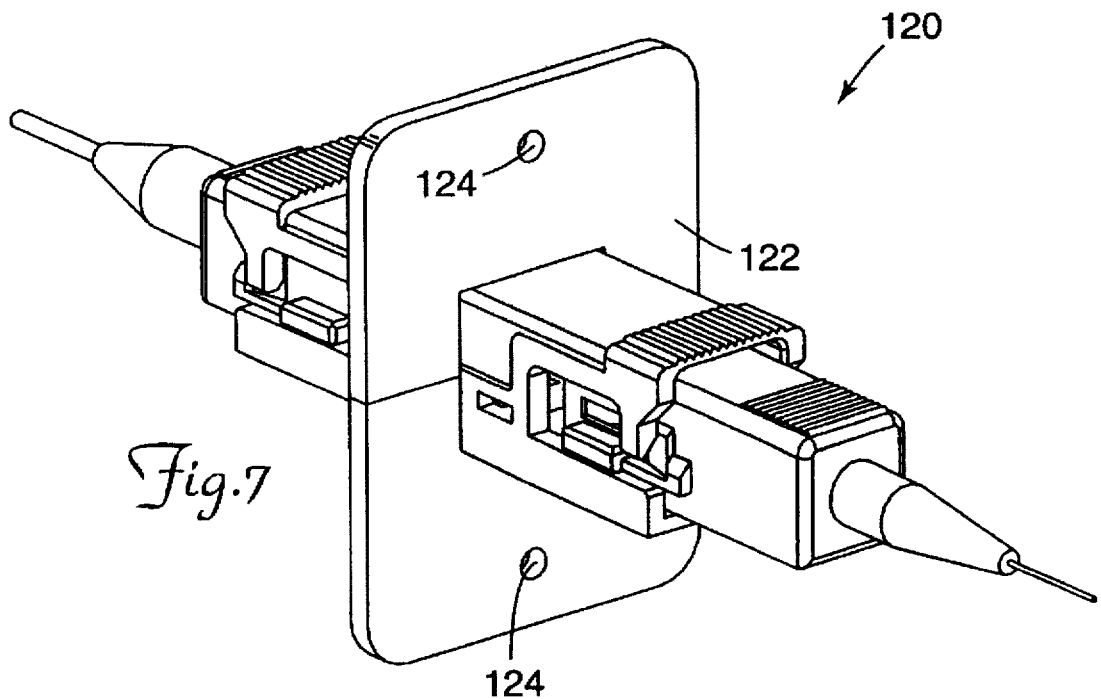
FIG. 7 is a perspective view of another connector constructed in accordance with the present invention and designed for panel mounting.

FIG. 7 illustrates another embodiment 120 of the connector of the present invention, configured with an externally projecting mounting flange 122 having mounting holes 124. Connector 120 is mounted on a connector panel (not shown) that is part of fiber distribution equipment. Panel mount connector 120 may be positioned on center spacings that enable easy finger access to individual connectors without disturbing adjacent connectors or their fibers.

Figure 8:
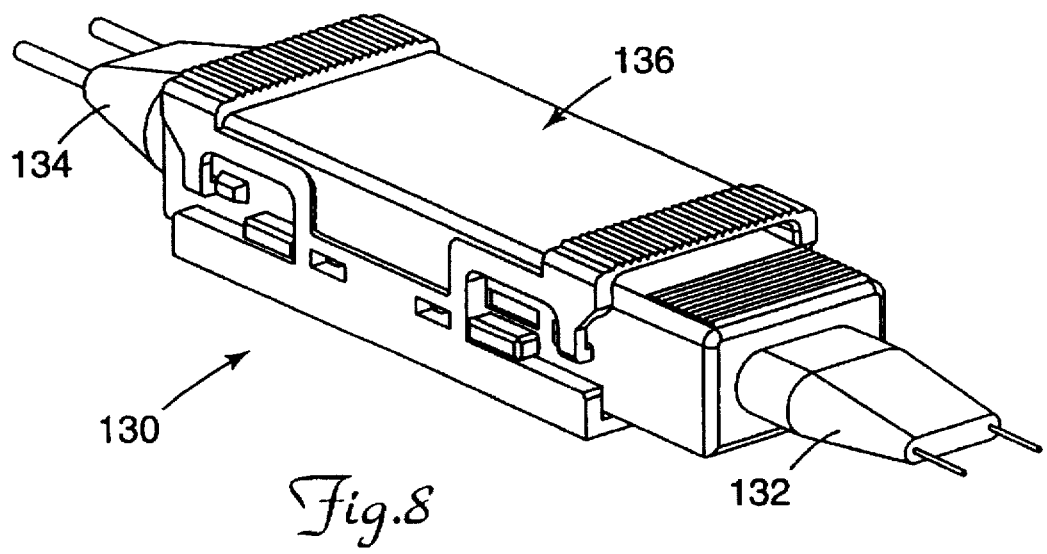
FIG. 8 is a perspective view of yet another connector constructed in accordance with the present invention in a duplex design.

FIGS. 1–4 and 6–7 illustrate designs according to the present invention which are useful for connecting discrete fibers mounted in individual connector plugs. FIG. 8 illustrates another design in which two discrete connectors similar to connector 10 have been unitized to create a duplex fiber connector 130. The connector plugs 132 and 134 in duplex connector 130 contain dual spring-loaded fiber protectors, fiber preloading means (springs) and fiber clamping means (collets). The duplex connector housing or receptacle 136 contains two alignment elements and two sets of entry ports for the internal fiber-guiding portions of the duplex connector plugs. The fiber spacing for this design of connector is preferably about 8 mm.

The designs of FIGS. 1–4 and 6–8 are PLUG-HOUSING-PLUG designs; however, it would also be possible to design a connector according to the present invention that uses the same interconnecting methods as the PLUG-HOUSING-PLUG design, but that would have one of the plugs permanently integrated into the central housing. This style of connector 140 is referred to as a PLUG AND SOCKET design and, as illustrated in FIG. 9, generally comprises a single plug 142 similar to plug 14 or 16, and a socket 144 containing a clamping and alignment element 90 and functional parts of the other plug all combined into a single unit. Connector 140 is particularly useful for those applications in which fiber rearrangement occurs only on one side of the connector (in front of the panel for example). The fiber on the other side of the connector (behind the panel) is permanent and would not be rearranged. Combining one of the plugs with the alignment housing to create a connector socket reduces connector part count, the size of the connector, and potentially the cost of the connector. As used in the claims, the term "receptacle" encompasses both the dual plug receptacle 12 and socket 144.

Use of any of the foregoing connectors is straightforward. When the fibers have been beveled, cleaned, and inspected, they are installed into the connector plugs. Beveling may be accomplished by, e.g., using the tools described in U.S. patent application Ser. No. 08/122,755. This is done by first installing one of the fully assembled empty connector plugs (not containing a boot) into a small actuation tool or fixture. This tool (not shown) would provide means for 1) guiding the prepared fiber into the connector plug, 2) providing a length stop for the tip of the fiber so that the correct amount of bare glass fiber exists inside the connector plug, and 3) actuating the collet internal to the connector plug in order to clamp onto the fiber buffer and secure the fiber into the connector plug without the use of adhesives or crimping tools. The prepared fiber is inserted through the fiber bending strain relief boot, and the boot is slid down the fiber and out of the way. A fully assembled connector plug is then be loaded into the installation tool, and the cleaved and beveled end of the fiber is inserted into the back end of the connector plug. The fiber is pushed toward the fiber protector end of the connector until the beveled tip end of the fiber contacts a stop gauge located in front of the slightly retracted fiber protector. With the fiber in the desired position, the craftsperson operates a handle on the installation tool which axially forces the collet into the collet housing, and permanently clamps the fiber buffer in the connector plug body or in the spring loaded collet assembly, depending on which style of plug is being assembled.

It is deemed preferable to use the connectors of the present invention in conjunction with optical fibers whose end faces have been beveled. The bevel angle is preferably about 45°, i.e., an included angle of about 90°, although the included angle may be in the range of 30°–160°. Beveling leaves a flat, central area on the endface of the fiber, with a preferable diameter of between 20 and 120 µm. The central portion may be angled, i.e., non-orthogonal to the axis of the fiber, to reduce back reflections.

The connector plug is removed from the tool, and any strength members (Kevlar strands) can be secured directly to the plug body of the 900 µm style connector plug using standard crimp rings, etc. The 250 µm connector plug design could also be used with reinforced cable types, but the plug would have to be extended to allow for a bow in the fiber between where it is clamped in the spring-loaded collet, and the back end of the connector. This fiber bowing region is necessary because the spring loaded collet is pushed back in the connector body against the 0.9N (0.20 lb) preload spring to create the desired level of compressive preload on the fiber tips. A longer plug body (not shown) would have to provide enough internal space to accommodate the additional fiber length, as a fiber bow, when the fiber is rigidly clamped at the back of the connector plug, and then pushed back inside the connector during insertion of the plug into the housing. The final step in the fiber installation procedure is to slide the strain relief boot back up the fiber and press it onto a hollow post through which the buffered fiber passes in the back of the connector plug body. As noted above, the buffer collet clamps can be disengaged and the fibers can be removed in the event that a fiber breaks inside the connector and needs to be replaced or re-cleaved and beveled.

The connector plugs would then be ready for insertion into a connector receptacle or socket. The first plug (e.g., 14) is inserted into the receptacle until the fiber protector enters into and bottoms out in the socket in guide tube 64. Continued motion of the plug causes the fiber protector to slide back into the plug body against the compression spring, and the cleaved and beveled fiber to enter the V-groove in the element. Additional pushing of the plug into the housing results in the fiber continuing to slide into the element until the tip of the fiber has gone slightly beyond the center of the element. At this point, the connector plug body moves flush against the front face of the alignment receptacle. Continue pushing of the connector plug cap causes the camming finger on the front of the cap to cam the element actuation flap toward the element and attempt to close the element on the fiber. If the other plug is not installed in the opposite side of the receptacle, the fiber clamping element will only rock over to one side in pocket 68, and the beveled tip glass fiber in the element is not clamped. The plug housing (e.g., 38) is pushed toward the receptacle until the latch on the receptacle engages the tabs on the sides of the plug housing, locking it into place.

When the other plug (e.g., 16) is inserted into the opposite end of the receptacle, its fiber protector bottoms out and guides the fiber into the end of element 90. Continued motion of the opposite plug into the housing pushes its fiber down the V-groove in the element toward the tip of the other fiber. When the two fiber tips contact one another in the V-groove, the compression spring pushing against the sliding fiber collet in one of the plugs begins to compress, and the fiber tip is preloaded to the desired load. The preloading of the fibers continues until the plug body of the remaining connector plug moves flush against its end of the alignment receptacle. At this point, the fibers are preloaded against one another in the element V-groove, but not clamped. The plug housing of the other plug would now continue to move which would cause its actuation finger to move into the center of the housing and cam the element closed onto the preloaded, stationary fibers. When the latch for the other plug engaged, the connection between the fibers is completed.

The 900 µm plug 16 has been designed with an optional pull-proof feature that operates between fingers on plug body 50 and guide tube 64. These components have mating flexible fingers that engage one another when the plug body fully enters the 900 µm end of the receptacle. These fingers lock the plug body to the alignment receptacle, and make the 900 µm plug end of the connector pull-proof. This pull-proof feature could also be provided on the other end of the connector, but the plug body would have to be lengthened to accommodate a bow in the fiber between the spring-loaded collet and preload assembly and the back end of the connector plug.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A device for interconnecting two bare optical fibers, comprising:

a receptacle having a clamping element movable between open and closed states, said clamping element adapted to secure the bare ends of the fibers in optical connection in said closed state;

a first plug assembly having a first optical fiber therein, a terminal endface of said first fiber being beveled, said first plug assembly including a first plug housing having first and second ends, first collet means for securing a portion of said first fiber within said first plug housing and for positioning said first fiber proximate said first end of said first plug housing, and first means for biasing said first collet means toward said first end of said first plug housing to place a preload condition on said first fiber when said first plug housing is inserted into said receptacle;

a second plug assembly having a second optical fiber therein, a terminal endface of said second fiber also being beveled, said second plug assembly including a second plug housing having first and second ends, and second collet means for securing a portion said second fiber within said second plug housing and for positioning said second fiber proximate said first end of said second plug housing such that said terminal endfaces of said first and second fibers are held in compressive engagement; and said first and second plug assemblies having means for moving said clamping element to said closed state when both of said plug assemblies are inserted into said receptacle.

2. The device of claim 1 wherein at least one of said terminal endfaces of said first and second fibers is cleaved at a non-orthogonal angle with respect to the fiber axis.

3. The device of claim 1 wherein said terminal endfaces of said first and second fibers are subjected to a compressive load of at least 0.09N.

4. The device of claim 1 wherein each of said first and second fiber endfaces has an included bevel angle in the range of 30°–160°.

5. The device of claim 1 wherein each of said first and second fiber endfaces has a flat, central area with a diameter in the range of 20 μm to 120 μm.

6. The device of claim 1 wherein said moving means moves said clamping element to said closed state only after said first and second fibers have been compressively engaged.

7. The device of claim 2 wherein said terminal endfaces of said first and second fibers are subjected to a compressive load of at least 0.09N.

8. The device of claim 7 wherein each of said first and second fiber endfaces has an included bevel angle in the range of 30°–160°.

9. The device of claim 8 wherein each of said first and second fiber endfaces has a flat, central area with a diameter in the range of 20 μm to 120 μm.

10. A device for interconnecting two optical fibers, comprising:

a receptacle having a clamping element movable between open and closed states, said clamping element adapted to secure the bare ends of the fibers in optical connection in said closed state;

at least one plug assembly having a first optical fiber therein, said plug assembly including a plug housing having first and second ends, means for securing a portion of said first fiber within said plug housing and for positioning said first fiber proximate said first end of said plug housing, and means for biasing said securing means toward said first end of said plug housing to place a preload condition on said first fiber when said plug housing is inserted into said receptacle such that a terminal endface of said first fiber is compressively engaged with a terminal endface of a second fiber located in said clamping element; and said at least one plug assembly having means for moving said clamping element to said closed state by insertion of said plug housing into said receptacle and thereby clamping the fibers in said clamping element only after said first and second fibers have been compressively engaged.

11. The device of claim 10 wherein said first optical fiber has a beveled terminal endface.

12. The device of claim 11 wherein said terminal endfaces of said first and second fibers are subjected to a compressive load of at least 0.09N.

13. The device of claim 12 wherein each of said first and second fiber endfaces has an included bevel angle in the range of 30°–160°.

14. The device of claim 13 wherein each of said first and second fiber endfaces has a flat, central area with a diameter in the range of 20 μm to 120 μm.

15. The device of claim 14 wherein at least one of said terminal endfaces of said first and second fibers is cleaved at a non-orthogonal angle with respect to the fiber axis.

16. A method of interconnecting two bare optical fibers, comprising the steps of:

cleaving a first optical fiber to provide an endface;

securing said first optical fiber in a first plug assembly, said first plug assembly including a first plug housing having first and second ends, and first means for securing a portion of said first fiber within said first plug housing and for positioning said first fiber proximate said first end of said first plug housing;

cleaving a second optical fiber to provide an endface;

securing said second optical fiber in a second plug assembly, said second plug assembly including a second plug housing having first and second ends, second means for securing a portion of said second fiber within said second plug housing and for positioning said second fiber proximate said first end of said second plug housing, and means for biasing said second securing means toward said first end of said second plug housing to place a preload condition on said second fiber when said second plug housing is inserted into a receptacle such that said endfaces of said first and second fibers may be held in compressive engagement therein;

inserting said plug assemblies into a common receptacle having a clamping element for receiving the optical fibers in such a manner that said endfaces of said first and second fibers are first compressively engaged before said clamping element is actuated; and actuating said clamping element by means connected to said plug assemblies for closing said clamping element on said compressively engaged fibers when said plug assemblies are fully inserted into said receptacle.

17. The method of claim 16 further comprising the steps of:

beveling said cleaved end face of said first optical fiber at an included bevel angle in the range of 30°–160°; and beveling said cleaved end face of said second optical fiber at an included bevel angle in the range of 30°–160°.

18. The method of claim 17 wherein:

said endfaces of said first and second fibers are subjected to a compressive load of at least 0.09N; and each of said first and second fiber endfaces has a flat, central area with a diameter in the range of 20 μm to 120 μm.

19. The method of claim 16 wherein said clamping element is constructed of a ductile material, and further comprising the step of forming a fiber-receiving groove in said clamping element by the sub-steps of:

sliding a third fiber in said clamping element;

actuating said clamping element about said third fiber;

de-actuating said clamping element; and removing said third fiber from said clamping element.

20. The method of claim 16 wherein said cleaving steps are performed by cleaving both of said endfaces of said first and second fibers at a non-orthogonal angle with respect to the fiber axes.

* * * * *